J. A. FLINT.
GYROSCOPE.
APPLICATION FILED MAY 10, 1919.
1,429,577.
Patented Sept. 19, 1922.
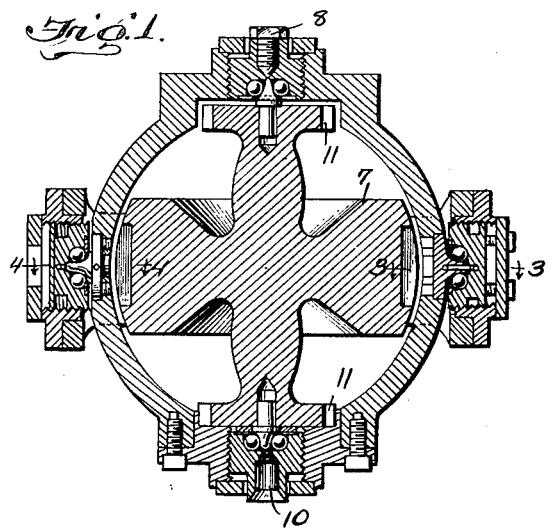
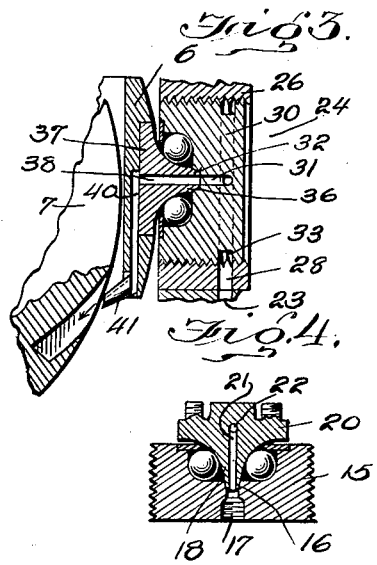
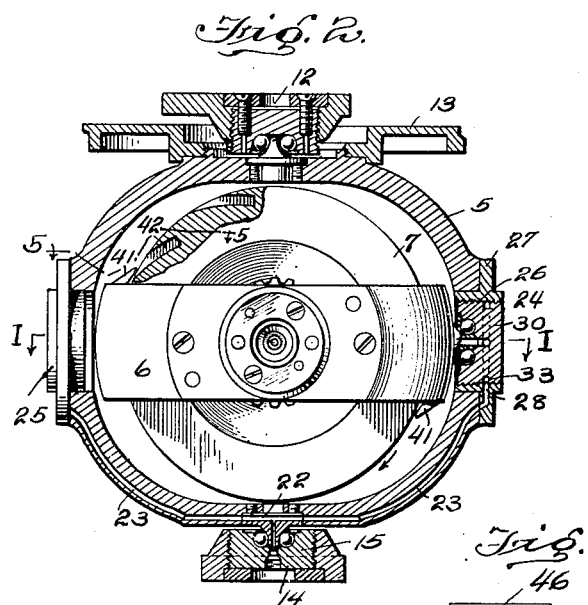
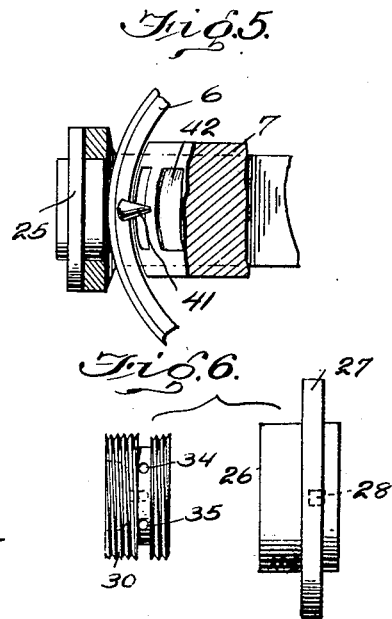
Inventor
J. A. Flint,
By Attorney Patented Sept. 19, 1922.

1,429,577

UNITED STATES PATENT OFFICE.

JAMES A. FLINT, OF DENVER, COLORADO, ASSIGNOR TO THE GOVERNMENT OF THE UNITED STATES.

GYROSCOPE.

Application filed May 10, 1919. Serial No. 296,124.

*To all whom it may concern:*

Be it known that I, JAMES A. FLINT, a citizen of the United States, residing at Denver, Colorado, have invented new and useful Improvements in Gyroscopes, of which the following is a specification.

This invention relates to gyroscopes, and more particularly to an improved air sustained gyroscope. Such gyroscopes are of value, for example, in automobile torpedoes and in any other connection where the advantages of a continuously driven gyro are sought.

In gyroscopes heretofore used in connection with automobile torpedoes, it has been customary to give the gyro fly wheel an initial spin simultaneously with the launching of the torpedo, and such spin is supposed to keep the gyro rotor or fly wheel running at a high rate of speed throughout the entire run of the torpedo. This method of operation is accompanied by some disadvantages, for instance, towards the end of the run the fly wheel would have its speed greatly diminished over that at the start, due to friction at the bearings, air resistance, etc., so that the directive force of the fly wheel, which is applied to steer the torpedo in a horizontal plane, is insufficient to accurately maintain the torpedo on its true course, and the torpedo tends to veer off to one side or the other.

In attempting to overcome this disadvantage, certain designs have been proposed of continuously driven gyros. Among these designs the electric gyro and the air sustained gyro have received the most consideration. However, of these types, the air-sustained gyro is generally accepted as being the most desirable, for a source of air supply is available within the torpedo to furnish the necessary power without an increase in the weight and equipment of the torpedo.

In applying an air jet directed against turbine vanes on a gyro wheel for the purpose of maintaining the gyro wheel at a constant speed throughout the entire run of the torpedo, it is very desirable that provision be made for applying this force in such a manner that there will be no resultant reaction tending to cause precession of the gyro or to produce any disturbance which might affect the original setting of the gyro. It is advisable, therefore, that provision be made to insure that the air be conducted to its point of application in a manner that reduces leakages to a minimum and with a structure that eliminates, as far as possible, any friction of the parts. It is along the before mentioned lines that my invention has been directed, and will be found particularly useful and advantageous.

Referring now to the drawings, in which like characters of reference designate the same part, Fig. 1 is a transverse cross-sectional view of my gyro taken along the line 1—1 of Fig. 2 and looking in the direction of the arrows;

Figure 2 is a side elevation of my gyro, with parts shown in section and part broken away for the sake of clearness;

Figure 3 is an enlarged cross-sectional detail view of one of the bearings and showing a nozzle, taken along the line 3—3 of Figure 1;

Figure 4 is an enlarged cross-sectional view of the lower bearing in Figure 2;

Figure 5 is a transverse cross-sectional view taken along the line 5—5 of Figure 2;

Figure 6 is a view of the bearings for the inner gimbal ring shown disassembled; and Figure 7 is a view showing an alternative construction of bearings.

The gyroscope 4 includes the usual vertical or outer gimbal ring 5, which provides bearings for the horizontal or inner gimbal ring 6, which in turn furnishes bearings for the turbine rotor or fly wheel 7. The bearings 8 and 10 for the gyro fly wheel, shown above and below in Figure 1, are similar to those customarily used in the initial spin gyro, and on the axis of such gyro wheel the usual gears 11 are provided for giving an initial spin to the wheel. The upper bearing 12 for the outer gimbal ring 5, (see Figure 2), is also of the usual construction, and the outer gimbal ring 5 is, as is customary, provided with a cam plate 13 for enabling the directive force of the torpedo to be applied to suitable uses.

The structure so far described forms no part of this particular invention, and may be altered or dispensed with as may be necessary according to the particular use to which the gyroscope is to be placed. I will now describe the features of construction which are unique with my invention.

The lower bearing 14 for the outer gimbal 5 of my gyro, appearing at the lower part of Figure 2, and shown in detail in Figure 4, includes the usual bushing 15 providing a race for the bearings, and also providing a seat 16 communicating with a threaded opening 17. This seat 16 cooperates with the similarly shaped lower end 18 of the bearing member 20, which member is secured to the outer gimbal ring 5 and is provided with a central passage 21, leading to a passage 22, at right angles thereto which extends in either direction through the base of the pivot member. Pipes 23 are inlaid in the lower part of outer gimbal ring 5, and communicate with the passage 22, providing means for conducting fluid to the bearings 24 and 25 of the inner gimbal ring, such fluid being led into the bearing member 14 by means of any suitable conducting member threaded into the opening 17.

The bearings 24 and 25 for the inner gimbal ring are of duplicate construction, and comprise each a bushing 26, threaded internally and provided with an annular flange 27 at the outer end. This bushing is secured in the outer gimbal ring 5 and is provided with a port 28, which registers with the pipe 23 countersunk in the outer gimbal. A bearing cup 30 in the form of a plug is threaded into the bushing 26, which bearing cup, (see Figures 3 and 6), has the usual race for the ball bearings, and in addition thereto a central longitudinal bore or passage 31, terminating at its upper end in a seat 32 which communicates with the race. This central longitudinal bore 31 extends into the body portion of the plug 30 for a substantial distance, and then communicates with an annular recess 33 in the outer periphery of the plug by means of two radial ducts 34 and 35, (see Figure 6), spaced slightly from each other. The bearing cup 30 is so disposed in the bushing 26 that the outer ends of these ducts 34 and 35 are equally spaced from either side of the port 28 in the bushing, so that there is no reaction or disturbing force brought about by the leading of the air to the bore 31 by way of these two radial passages. The seat 32 in the plug cooperates with the similarly formed end 36 of the bearing member 37, which member is provided with a central longitudinal bore 38, communicating with a passage 40 in the gimbal ring 6 at right angles thereto. This passage 40 is continued through the inner gimbal ring 6, terminating at one side thereof, where a nozzle 41 having threaded engagement with the gimbal ring, communicates with said passage 40.

As may be seen in Figure 2, there are two of these nozzles or fluid directing means 41 carried by the inner gimbal ring 6, one on each side of the bearing for the gyro wheel, and mounted respectively on the upper and lower sides of the inner gimbal ring in a common plane with the bearings thereof. By this means it is possible to balance the forces which are applied to drive the gyro wheel 7 and eliminate any possibility of disturbing forces which might cause precession, etc., of the gyro.

In the modified form of bearing shown in Figure 7, the lower end of the bearing member 43 cooperates with a suitable seat in bushing 44 and is provided with a concave or bell-shaped end 45 communicating with the central air feed passage 46 in the bearing. This form of construction may be used either with bearings 14 or 24.

With the structure herein disclosed and just discussed, I am enabled to obtain very superior results with this gyro. By the taking in of the air through one of the bearings of the outer gimbal ring and leading it thence through the outer gimbal ring to the opposite bearings of the inner gimbal ring and disposing the nozzles in the manner I have described, on the opposite sides of the inner gimbal ring, I am enabled to maintain a constant relation between the position of the nozzles and the plane of rotation of the gyro wheel. And no matter what relative movement may take place between the outer gimbal ring 5 and the inner gimbal 6, the nozzles 41 are always directed toward the same point on turbine buckets 42 and there are no disturbing forces set up. Thus, when a torpedo is launched from a battleship or submarine at an angle of depression or elevation, the inner gimbal ring is caused to tilt at the moment of launching and is maintained in this same tilted position throughout the run. In the devices hitherto known in the art, when the inner gimbal is tilted, the jet of air so strikes the turbine buckets that a certain component of the driving force tends to cause a precession of the gyroscope, which will in turn cause the torpedo to swerve off its course, rendering the devices both inefficient and ineffective. This disadvantage I have overcome by the manner of the mounting of my air nozzles on the inner gimbal ring so that no matter what tilt the inner gimbal ring may have at the moment of launching, the relaton of the nozzles to the turbine buckets is always the same, and there is no resultant force tending to produce precession of the gyro or cause other disturbances.

Also, by thus leading the air to nozzles in the inner gimbal ring by way of the bearings of the rings, I, if anything, reduce the friction at the bearing points and also provide a structure with a minimum of leakage.

The manner of operation of my device is simple. If used in connection with a torpedo, I simply connect up with the threaded opening 17 in the bearing 14, a pipe leading to the source of air supply. If desired, the wheel may be given an initial spin by means of the gears 11 and the standard mechanism used for this purpose. The tripping of the starting lever to actuate the initial spin mechanism may at the same time open a check valve and release the air feed to the bearing 14. Air passes thence through the passages 21 and 22, to the inlaid pipes 23, leading from each side of bearing 14 to bearings 24 and 25 for the inner gimbal ring 6, thence on through ports 28, annular recesses 33, radial ducts 34 and 35, passages 31, 38 and 40, finally passing out at nozzles 41 to impinge on the buckets 42 of the gyro wheel 7 to spin the same.

From the above it will be seen that the present invention embodies a simple and practical mechanism adapted to accomplish among others all of the objects and advantages herein set forth.

What I claim is:

1. A bearing for fluid sustained gyroscopes comprising in combination, a threaded bushing provided with a port, a bearing cup threaded within said bushing and provided with an annular recess communicating with said port, said bearing cup also being provided with a bearing seat and with fluid conducting means connecting said annular recess and said seat.

2. A bearing for fluid sustained gyroscopes comprising, in combination, a pivot member provided with a fluid conducting passage, a cooperating bearing member providing a seat and a ball race for supporting said pivot member, and a threaded bushing embracing said bearing member, said bearing member and bushing providing a fluid conducting passage communicating with said first named passage.

3. A bearing for fluid sustained gyroscopes comprising, in combination, a pivot member provided with a tapered end and a fluid conducting passage terminating at said end, a bearing member providing a seat, cooperating with said tapered end of said pivot member, and a ball race for supporting said pivot member, and a threaded bushing embracing said bearing member, said bearing member and bushing providing a fluid conducting passage communicating with said first named passage by way of said seat and said tapered end of said pivot member.

Signed at Washington, D. C., this 28th day of February, 1919.

JAMES A. FLINT.